(12) United States Patent
Tilley et al.

(10) Patent No.: US 6,507,142 B1
(45) Date of Patent: Jan. 14, 2003

(54) PLUME SHIELD FOR ION ACCELERATORS

(75) Inventors: Dennis L. Tilley, Redmond, WA (US); David Q. King, Woodinville, WA (US)

(73) Assignee: Aerojet-General Corporation, Redmond, WA (US)

( * ) Notice: Subject to any disclaimer, the term of this patent is extended or adjusted under 35 U.S.C. 154(b) by 2 days.

(21) Appl. No.: 09/625,598

(22) Filed: Jul. 26, 2000

(51) Int. Cl.[7] .............................. H05H 1/54; H01J 27/02
(52) U.S. Cl. .................. 313/239; 313/240; 315/111.61; 315/111.21; 250/423 R; 60/202
(58) Field of Search .................................. 313/239, 240; 315/111.61, 111.21; 60/202; 250/423 R (56) References Cited

U.S. PATENT DOCUMENTS 3,983,695 A * 10/1976 Power .......................... 60/202
4,937,456 A * 6/1990 Grim et al. .................. 250/427

OTHER PUBLICATIONS

S. Shimada et al, "Development of Ion Engine System for ETS–VI," Proceedings of the 23rd International Electric Propulsion Conference, vol. 1, Papers IEPC–93–116 through IEPC–93–124 (Sep. 1993).

* cited by examiner

Primary Examiner—Bruce Anderson
Assistant Examiner—Nikita Wells
(74) Attorney, Agent, or Firm—Christensen O'Connor Johnson Kindness PLLC (57) ABSTRACT

A series of long slats, preferably parallel and spaced apart uniformly, extend from a base plate to form a series of cavities between the slats for trapping high energy ions in the exit plume of an ion accelerator. The plume shield is designed to minimize escape of ions and sputtered atoms from the shield. The effectiveness of the shield in trapping and retarding ions and sputtered atoms can be accomplished by biasing the potential of the shield with respect to an adjacent structure and by inducing a magnetic field parallel to a target area of the shield, which can limit electron current to the target area.

6 Claims, 7 Drawing Sheets

PLUME SHIELD FOR ION ACCELERATORS

FIELD OF THE INVENTION

The present invention relates to a system for protecting structures or components adjacent to ion accelerators from erosion or other damage by impact of accelerated ions with such structures and/or by impact by sputtered atoms resulting from the accelerated ions contacting other surfaces.

BACKGROUND OF THE INVENTION

Electric propulsion thrusters use steady, quasi-steady, oscillating and transient electric and magnetic fields to accelerate ions to high exhaust velocity. Due to their high exhaust velocity, electric thrusters are finding increased application on commercial and government satellites. Significant propellant mass savings is realized by increasing the thruster exhaust velocity. Electric thrusters typically accelerate ions to exhaust velocities which are much greater (>15,000 m/sec) than present-day hydrazine monopropellant engines (2200 m/sec). A critical issue associated with electric thruster implementation is the erosion and sputtering which occurs when high-energy ions impinge upon spacecraft surfaces.

For example, two high-energy thrusters in current use today are the Hall thruster and ion engine. Both thrusters use xenon as a propellant and emit high-energy ions axisymmetrically in the $2\pi$ space from the exit plane. Thruster plumes are typically differentiated from each other by the mean ion energy, and by how collimated the ion beam is as characterized by the "plume divergence angle". The plume divergence angle is the half angle, from the thruster centerline, which encloses 95% of emitted ions. The Hall thruster typically has a plume divergence angle of 40–45 degrees, with xenon ion energies in the 200–400 eV range. The ion engine is much more collimated with a plume divergence angle of approximately 20–25 degrees and ion energies greater than 1000 eV. The plasma created by both thrusters is quasineutral throughout the plume.

Many spacecraft configurations, in particular those of geosynchronous satellites, require that some external spacecraft components (e.g. spacecraft solar arrays, antennas and thermal heat rejection panels) be positioned within the electric thruster plume. One integration issue to be resolved is the sputter erosion of these components. The obvious effect of such sputtering is the degradation of the adjacent component. In the case of a solar panel, the undesirable result can be a decrease in the solar array power generation; in the case of antennas, antenna performance reductions may occur; and in the case of thermal heat rejection panels, the problem could be a loss of thermal control.

Another issue is the redeposition of sputtered atoms (released as a result of impact by high energy ions in the plume) onto sensitive spacecraft surfaces such as optics and thermal heat rejection panels. The deposition rates associated with low-energy sputtered atoms and ions are difficult to predict for a number of reasons. First, the distribution of sputtered atom ejection velocities and charge state is usually unknown. Second, their motion is largely influenced by the local electric fields near spacecraft surfaces, which are difficult to predict. Third, sputtered atoms will interact with the high energy ions from the thruster (via charge exchange reaction) to create positively charged metal ions, which are subsequently forced by electric fields in the plume toward spacecraft surfaces.

In general, the above issues are engineered using a number of methods. One method, used on geosynchronous satellites, is to cant the thruster away from sensitive surfaces, in particular the solar arrays. Cant angles are typically on the order of 45 degrees from the optimum thrusting direction, which results in a significant thrusting efficiency and propellant loss. Due to canting, thruster lifetime requirements are increased, resulting in expensive qualification life tests extending up to 10,000 hours. In addition to canting, degradation can be minimized by optimizing the position of critical surfaces with respect to the thruster and by adding additional margin in surface thicknesses, power budgets, etc. Such optimization is performed under the constraints associated with providing the optimum spacecraft configuration. This approach requires a detailed model of the motion of high-energy ions and deposition products in conjunction with validation testing and fundamental measurements of sputtering processes. Modeling and testing associated with this approach are time consuming, and carry the risk of not modeling all of the relevant physics. Another approach to mitigating contamination issues is to limit thruster operation to those times when the external component is within an acceptable position relative to the plume. The thruster firing keep-out zone approach has the drawback of complicating mission operations, thus increasing the total mission cost.

All of the above mitigation approaches will become increasingly difficult to engineer in the future for the following reasons. First, the trend in satellite capability is toward higher power levels and longer thruster firing times. These trends increase the total exposure of high-energy ions impinging onto spacecraft surfaces. Thrusters in operation currently operate at power levels of 0.5 to 4.0 kW. Future missions have projected power levels as high as 50 kW. The second trend in spacecraft design is toward the placement of more components outside of the spacecraft and further out from the spacecraft. Examples include larger and more antennas, larger solar arrays, larger radiation panels, all of which will make the spacecraft system design task increasingly more difficult with respect to integrating electric thrusters.

Yet another approach has been to add a flat plate called a plume shield between the thruster and a sensitive surface or component. Typically a plume shield is formed of low-sputter yield material. The shield screens spacecraft components from high-energy ions. However a drawback associated with known plume shields is that the sputter products from the plume shield itself will contaminate sensitive spacecraft surfaces. As stated earlier, there are many mechanisms leading to the contamination of critical surfaces. Thus incorporating known plume shields still requires detailed trade studies, analysis, and tests.

An example of a plume shield is described in a publication by S. Shimada et al., "Development of Ion Engine System for ETS-VI," Proceedings of the 23rd International Propulsion Converence, Seattle, Wash., U.S.A., September 1993, Paper No. IEPC 93-009, vol. 1, pp. 116–124. The plume shield described in this publication was mounted very close to the thruster and was constructed of an aluminum alloy in the known flat plate configuration. The thruster power level was low, only 700 W. The primary purpose of the plume shield was to protect the spacecraft thermal control surfaces from the deposition of molybdenum eroded from the ion engine grids.

SUMMARY OF THE INVENTION

A plume shield in accordance with the present invention significantly reduces the creation of sputter products, yet still performs the function of screening high-energy ions. The benefits of a low-sputter product plume shield are significant. It allows for possible reduction of the cant angle, which is equivalent to a thruster performance increase. It mitigates the need for thruster on-time keep-out zones, and thus allows for significant cost savings in mission operations and mission design. It allows more design freedom in positioning thrusters and spacecraft external components, and thus significantly reduces the cost associated with integrating electric thrusters on spacecraft. From a plume impacts point of view, this invention enables the use of very high power (>50 kW) electric thrusters on geosynchronous spacecraft.

In one embodiment, a plume shield in accordance with the present invention incorporates a series of long slats, preferably parallel and spaced apart uniformly, extending from a base plate. This "louvered" design forms a series of cavities between the slats which trap high energy ions and atoms sputtered from the shield. In a preferred design, the slats extend lengthwise in a direction generally parallel to the axis of the plume, and have their widths extending radially. The outer marginal portions of the slats can be angled to form a target area or segment which can assist in trapping sputtered atoms and preventing them from escaping from the shield.

In another aspect of the present invention, the effectiveness of the shield in trapping and retarding ions and sputtered atoms is accomplished by biasing the potential of the shield with respect to the spacecraft structure. This can result in slowing ions to energies below the sputter threshold energy. Magnets may be used to create a magnetic field parallel to a target area of the shield, which can limit electron current to the target.

Other aspects of the invention are described in more detail below.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
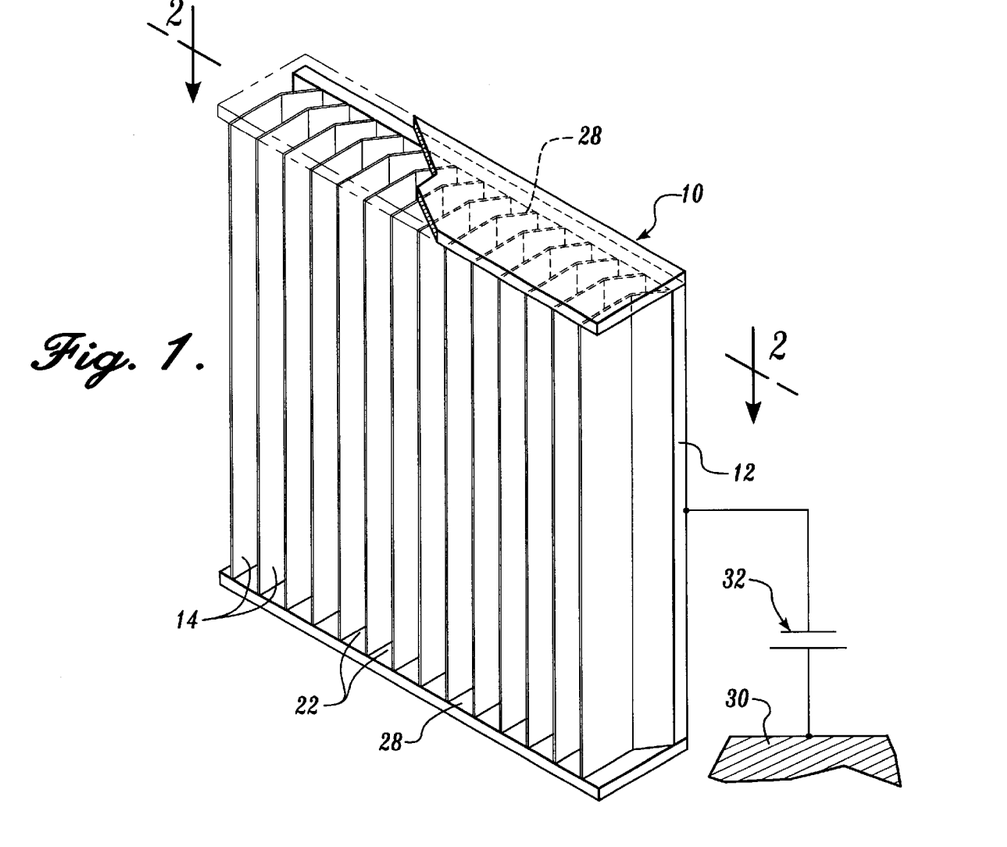
FIG. 1 is a diagrammatic top perspective of a plume shield for ion accelerators in accordance with the present invention.
Figure 2:
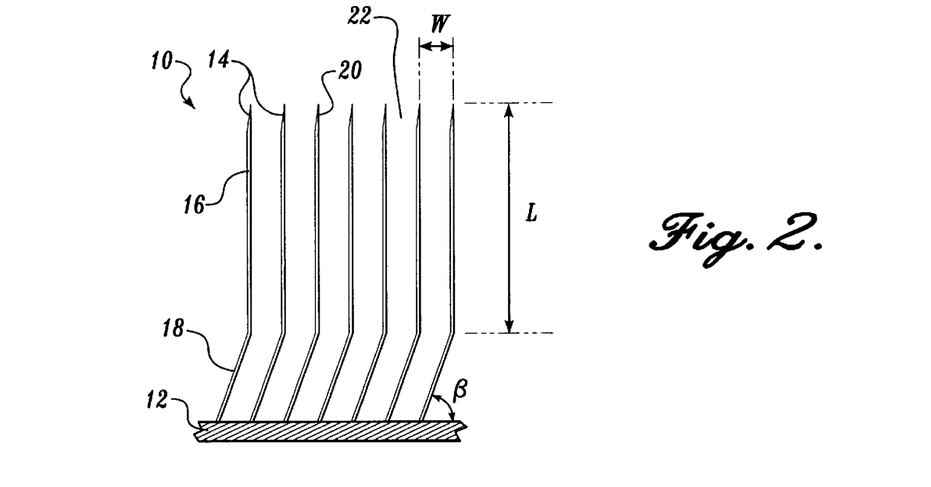
FIG. 2 is a fragmentary section taken along line 2—2 of FIG. 1.

In the embodiment shown in FIGS. 1 and 2, a louvered plume shield 10 in accordance with the present invention has a base plate 12 and a number of parallel louvers or slats 14 extending from the base plate. In the illustrated embodiment, each slat has an outer portion 16 and an inner "target" portion or segment 18 extending between the base plate 12 and the outer portion 16. Preferably, the outer portion of each individual slat 14 is aligned with the local velocity vector of incoming ions from an adjacent ion accelerator. The outer or upstream edges 20 of the slats are knife edged to minimize atom sputtering by ion contact at such edges.

The vast majority of ions diverging from the centerline of the plume of the accelerator will enter the cavities 22 formed between adjacent slats 14. Typically, the ions will glance the outer portion of the slats at a small acute angle, with a greater impact at the angled target segments 18 where some sputtering may occur. Nevertheless, the cavity geometry captures the ions and, preferably, at least the majority of atoms sputtered from the target segments onto the slats, thus minimizing the amount of sputtered material escaping the plume shield.

Figure 3:
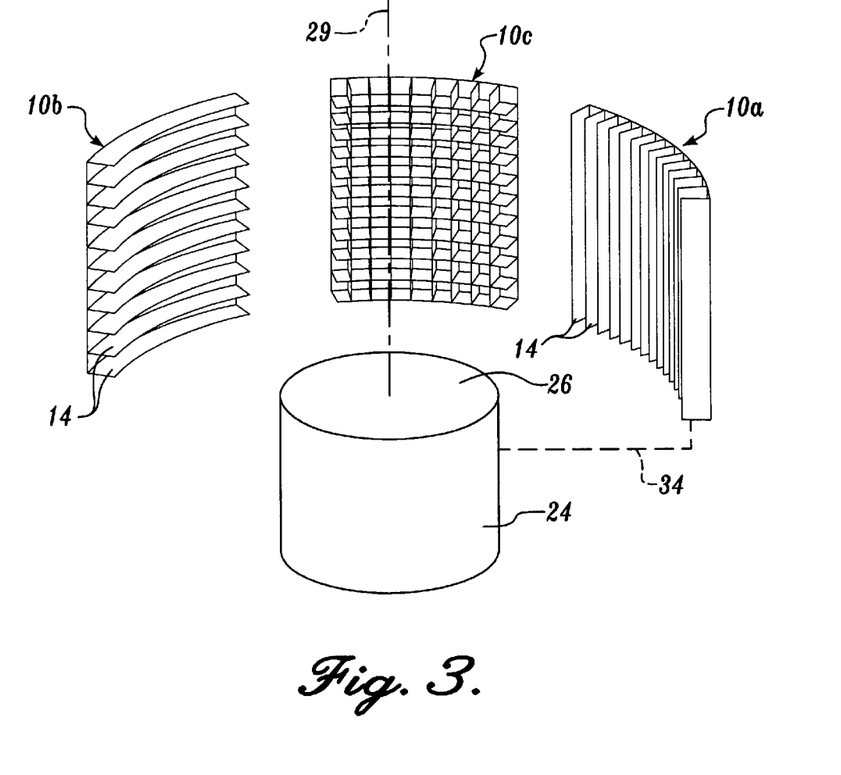
FIG. 3 is a diagrammatic top perspective of an ion accelerator having different arrays of plume shields in accordance with the present invention positioned adjacent to the exit plane of an accelerator-thruster.

With reference to FIG. 3, typically ion velocity vectors from an ion accelerator such as a thruster 24 beyond the exit plane 26 are axisymmetric about the thruster centerline 29. Thus, such vectors are a function of distance and angle from the centerline only. The slats 14 of a plume shield 10a in accordance with the present invention can be axially aligned, or the slats can be aligned perpendicularly to the velocity vectors, as illustrated for shield 10b, or a plume shield such as shield 10c shown in FIG. 3 can have slats aligned both axially and transversely. The preferred configuration is axially aligned (embodiment 10a), because configurations having transverse slats are more sensitive to alignment and may result in more sputtered atoms being created at the outer edges of the slats and therefore escaping the shield. With reference to FIG. 1, where axially aligned slats are used, it is preferred that the shield include transverse end plates or guards 28 to minimize the escape of ions or sputtered atoms along the direction of the slats.

Material sputtered from the louvered plume shield 10 is minimized when the slats 14 and target segments 18 are constructed of low-sputter yield materials such as graphite, titanium, aluminum and alumina. However the utility of the louvered plume shield invention is not limited by material type and the material will be selected based on the individual spacecraft configuration and contamination issues. Material coatings on target segments and slats to reduce the effective sputter yield can be fully utilized in the louvered plume shield. Examples of such coatings include alumina coatings, diamond film coatings, and the flocking of small carbon fibers to the target surface.

The plume shield performance can be characterized by the escape fraction, defined as the rate of sputtered atoms escaping the louvered plume shield per unit area and per unit flux of incoming ions, divided by the rate of sputtered atoms escaping a flat plate constructed of the same target material per unit area and per unit normal-incident flux of ions. The louvered plume shield escape fraction can be optimized by varying the voltage of the plume shield with respect to the spacecraft surface 30. There are three bases for this expectation. First, atoms sputtered off materials typically have a distribution of positive-charged, negative-charged, and neutral atoms. Thus a sputtered positive ion will be attracted back to a negatively-biased plume shield and not escape. Second, the sheath voltage near the surface of the slat 14 and target segment 16 will slightly affect the incoming angle of the ion depending on whether the sheath is ion attracting (which is generally the case) or ion repelling. The sheath voltage depends on a number of factors including the applied voltage on the plume shield and the plasma density near the shield. Third, the effective energy of the incoming ions can be reduced by positively biasing the louvered plume shield to retard the energy of in-coming ions.

A power supply 32 (FIG. 1) can be used to bias the louvered plume shield voltage positive and/or negatively with respect to the spacecraft 30. Depending on the voltage, the plume shield 10 also requires a certain level of power. For instance, biasing the plume shield positively (to retard ion energies) will also attract a large amount of electron current, which must be processed by the power supply 32. The current processed by the power supply is proportional to the local plasma density which is a function of the location of the plume shield with respect to the thruster, the thruster type, and thruster power level. Therefore the power required by the shield is a factor to be traded in plume shield design. Alternate plume shield configurations are described below to specifically address the issue of minimizing the plume shield power. The power supply 32 can vary the voltage of the plume shield with respect to spacecraft ground. The preferred configuration consists of a power supply connected between the plume shield and a floating element of the electric thruster power system. This enables the plume shield electric circuit to be independent of the spacecraft chassis.

Figure 4A:
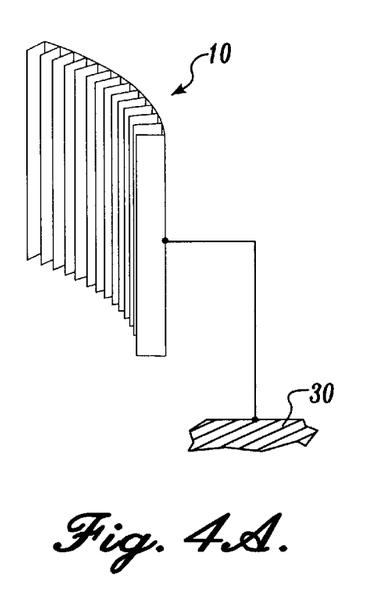
FIGS. 4A and 4B are diagrammatic perspectives of a plume shield in accordance with the present invention showing the electrical interconnection of a representative shield with a spacecraft.
Figure 4B:
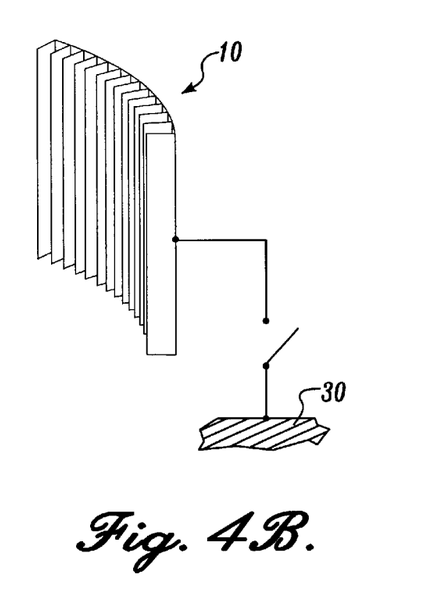

Due to power restrictions and/or reliability concerns, the plume shield can be connected in a number of methods such that an independent power supply is not required. FIGS. 4A and 4B show two electrical configurations where a power supply is not required. One method (FIG. 4A) is to connect the plume shield 10 directly to the spacecraft chassis 30. Another method (FIG. 4B) is to isolate the plume shield 10 from the spacecraft chassis 30. During thruster operation, the plume shield will typically float negative with respect to the spacecraft chassis to become electron repelling and ion attracting. The voltage at which the plume shield floats with respect to spacecraft ground is called the plume shield floating potential. The plume shield floating potential is primarily dependent on the average electron temperature in the region of the plume shield.

Another viable method to passively vary the plume shield voltage is to electrically connect the plume shield to one of the electric thruster power supplies (represented diagrammatically by the broken line 34 in FIG. 3). Such a method is particularly viable when the plume shield is located in a low-density region of the plume such that very little power is processed by the plume shield. Electric thrusters commonly utilize a number of power supplies, all floating at different voltages with respect to spacecraft ground. If the voltage is greater than the plume shield floating potential, a net electron current will be attracted to the plume shield. If the voltage is less than the plume shield floating potential, a net ion current will be attracted to the plume shield. In addition to its thruster-specific function, the thruster power supply must be capable of processing the power associated with the plume shield.

With the plume shield in an unbiased mode (shown in FIG. 4B), the rationale for the design is as follows: as shown in FIGS. 1 and 2, the slats 14 are knife-edged at the upstream edge, and made as thin as possible limited by the need to maintain structural integrity. The slats are aligned with the ion velocity vector such that the flux of ions on these surfaces is very small. Aligning the slots with the ion velocity vector also ensures that ions strike the shield at a grazing angle such that the probability of sputtering an atom from the slat is very small. Essentially all ions entering the plume shield cavity 22 will strike a target segment 18. The fraction of sputtered atoms escaping a cavity decreases significantly as the aspect ratio (cavity depth or "length" to distance between adjacent slats—abbreviated as l/w) increases.

The incident angle β of the target segment, defined where zero is normal to the surface, has a strong effect on both the amount of target material sputtered and on the amount of sputtered material escaping the plume shield. For all materials, the sputter yield has been observed to increase as β increases up to an angle ranging from 50–75 degrees. Beyond the angle corresponding to sputter yield maximum, the sputter yield is observed to fall rapidly to zero at 90 degrees. Modeling indicates that for a reasonable aspect ratio (l/w=5) and β>80 degrees, the fraction of atoms escaping the plume shield, compared to a flat plat shield, is less than 1 in 1000.

The above calculation is based on the assumption that sputtered atoms are distributed in a cosine distribution about the target surface normal. This assumption is generally correct when ions strike a surface at normal incidence. However, when ions strike the target at an angle, amorphous materials emit sputtered atoms in a preferential direction away from the incident ion velocity vector (angle θ) typically approximately 45 degrees from normal. In this invention, it is preferred that β be a large angle, preferably at least ensuring that the majority of sputtered atoms are captured in the cavities 22 between the slats 14. The primary disadvantage of increasing θ to very large values is that the length of the cavity may become practically too large.

As noted above, preferably the target segments 18 and slats 14 are constructed of low sputter yield materials such as graphite, aluminum, alumina and titanium. To minimize spalling of thin target material layers on the slats, the preferred design approach is to make the target and slats identical materials. Sputter-resistant coatings can be utilized on the target and/or the slats to simplify the cost and design of the louvered plume shield. For instance, an aluminum louvered plume shield can be coated with a thin alumina coating. A similar alternative is to use diamond film coatings. In situations where the plume shield is very close to the thruster, it may be desirable to construct a plume shield with a material which does not create negative ions (which get attracted into the thruster). The sputtering of zinc does not create negative ions, making zinc an appropriate choice for such an application.

Figure 5A:
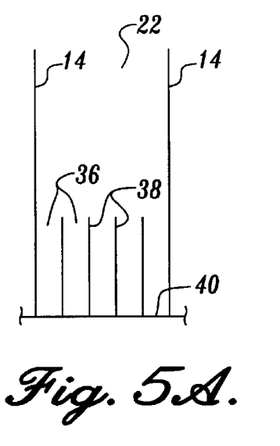
FIGS. 5A–5E are corresponding fragmentary sectional views of different configurations of ion and sputtered atom-trapping cavities of a plume shield in accordance with the present invention.
Figure 5B:
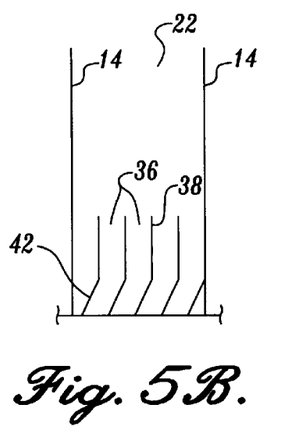
Figure 5C:
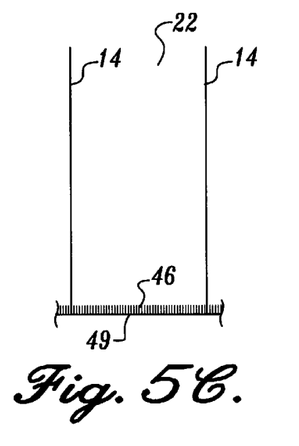
Figure 5D:
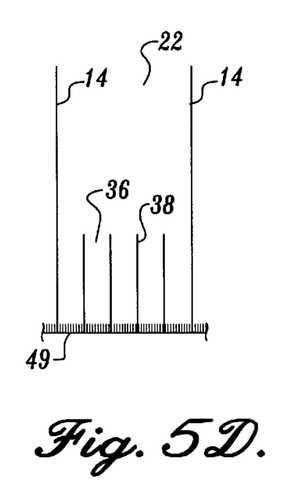
Figure 5E:
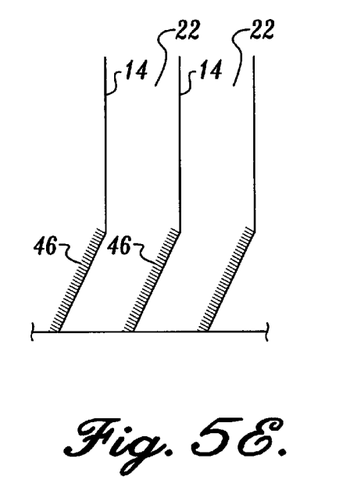

The louvered plume shield can also accommodate a myriad of cavity configurations which may have performance, design and cost advantages over the preferred design shown in FIG. 2. FIGS. 5A–5E illustrate some alternate configurations. FIG. 5A shows a cavity configuration with mini-cavities 36 between mini-slats 38 and mini-targets 40. As shown in FIG. 5B, mini-targets 42 can be angled with respect to incoming ion motion to minimize the sputter product escape fraction. FIG. 5C shows a configuration where a target segment 44 is coated with a layer of flocked thin fibers 46 made of a material such as carbon. FIG. 5D is the same as FIG. 5A, except for the addition of flocked fibers 46. FIG. 5E shows the preferred cavity configuration, with the addition of flocked fibers 46. The louvered plume shield invention is not limited by the microstructures identified in FIGS. 5A–5E.

The ability to bias the plume shield positive with respect to the spacecraft has a clear advantage of significantly reducing the incoming ion energy (and thus the sputter yield). This technique holds great promise for engines such as the Hall thruster where ion energies are in the 200–400 eV range. The disadvantage of such a plume shield configuration is that large electron currents are attracted to the shield, thus necessitating a large power supply.

Figures 6A, 6B:
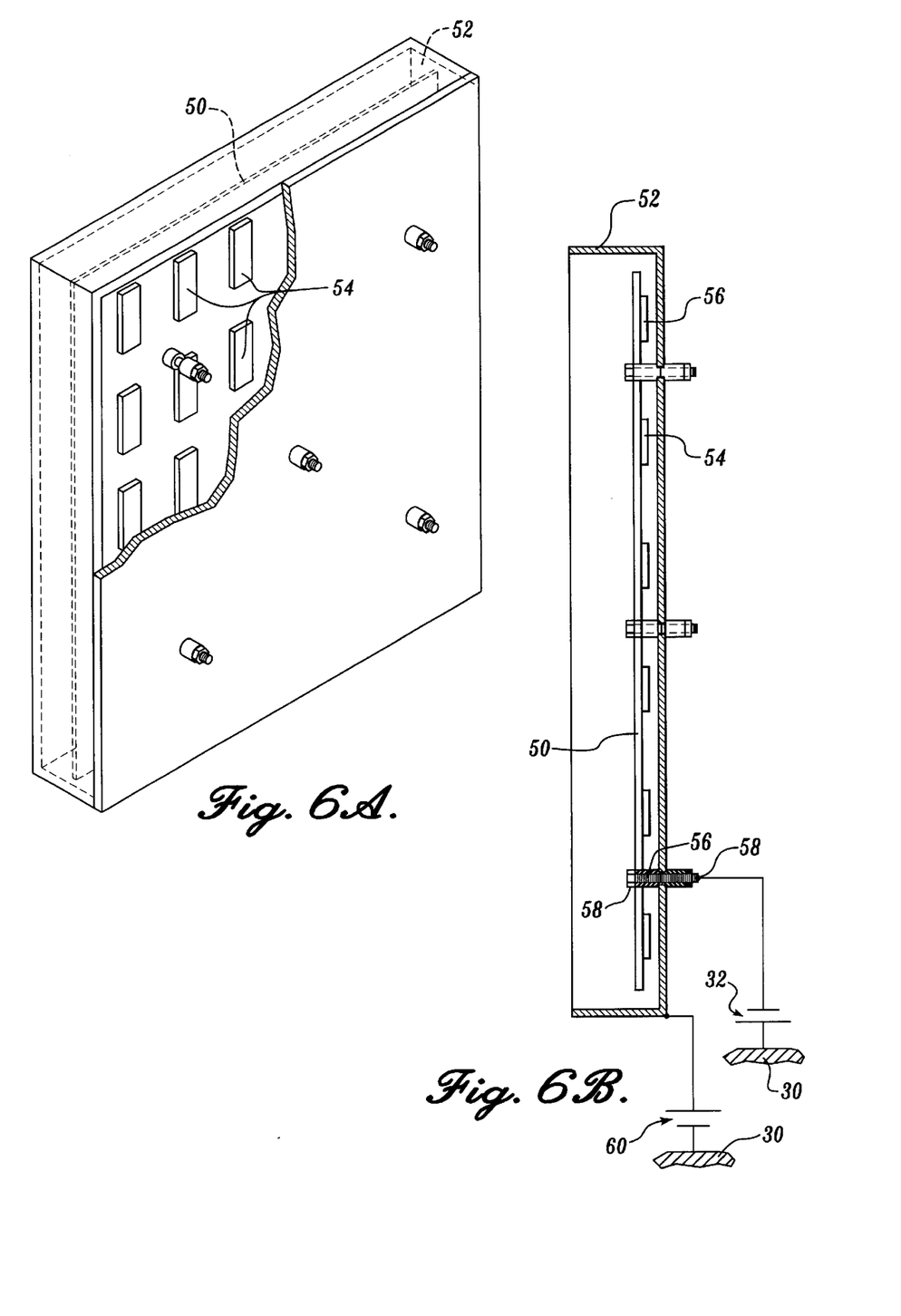
FIG. 6A is a top perspective of an alternative plume shield for ion accelerators in accordance with the present invention.
FIG. 6B is a diagrammatic side elevation thereof with parts broken away.

A configuration to minimize the electron current is shown in FIGS. 6A and 6B. The invention consists of a target 50, an electron shield enclosure 52, and an array of permanent magnets 54. The target 50 is made of a low sputter yield material such as graphite and is electrically isolated from the electron shield enclosure 52 by ceramic spacers 56 which are also used to structurally support the target in the enclosure 52 by means of nut and bolt fasteners 58. The target is biased positive with respect to the spacecraft 30 by a power supply 32 through the fasteners which are conductive. The voltage on the power supply should be sufficient to reduce the ion energies below the sputter threshold energy (~50 eV or less). The purpose of the permanent magnets is to create a magnetic field orientated parallel to the target surface. This magnetic field will retard electron current from attaching to the target. Without the magnetic field, the high voltage target will attract an electron current proportional to the local electron density, the electron thermal speed, and target area. With the magnets, a large magnetic field is created which reduces the electron current by the square of the electron Hall parameter, which can be designed to be a factor of 50 to 500 depending on the detailed plume shield design. To enhance the Hall parameter, the target must be thin and placed as close as possible to the magnets. In the illustrated embodiment, the magnets are secured to the baseplate of the target 50. If the magnets are attached to the shield enclosure 52, the enclosure and ceramic spacers 56 should be thin. The electron shield enclosure also functions to shield electrons from attaching to the target from the back side. All attachments to the target, such as the nut and bolt fasteners, should be insulated to eliminate electron current to these surfaces. The enclosure can be biased independently from the target and from the spacecraft using a separate power supply 60. The enclosure can also be allowed to float with respect to spacecraft ground, or be attached to ground. As discussed above, electric thruster power supplies can also be used to provide the power required for power supplies 32 or 60.

Figure 7A:
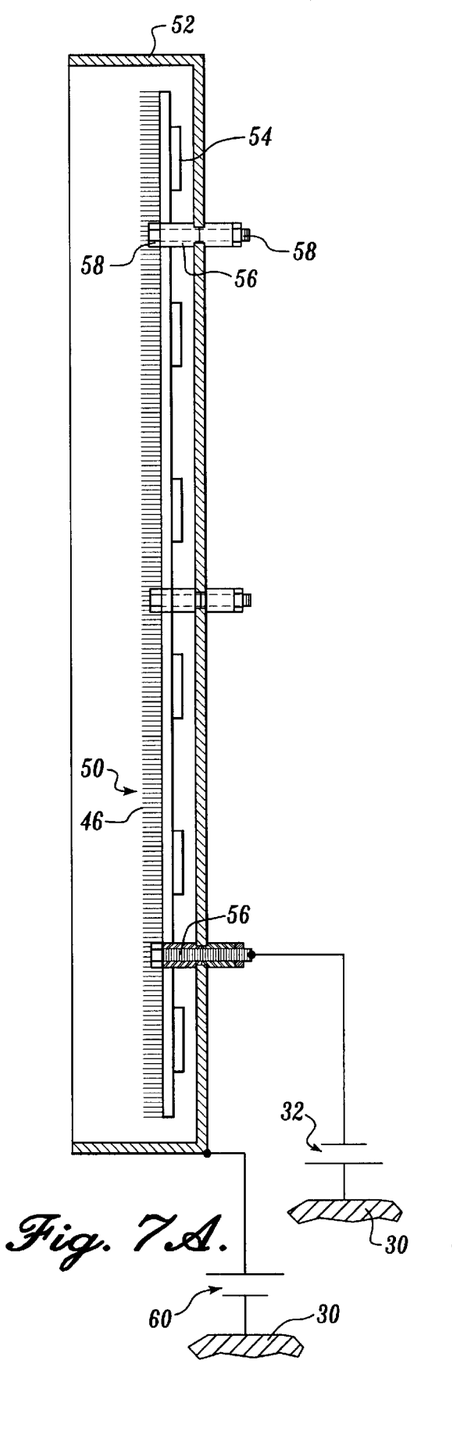
FIGS. 7A and 7B are corresponding diagrammatic end elevations of plume shields similar to the shield of FIG. 6A, but with modified components, with parts broken away.
Figure 7B:
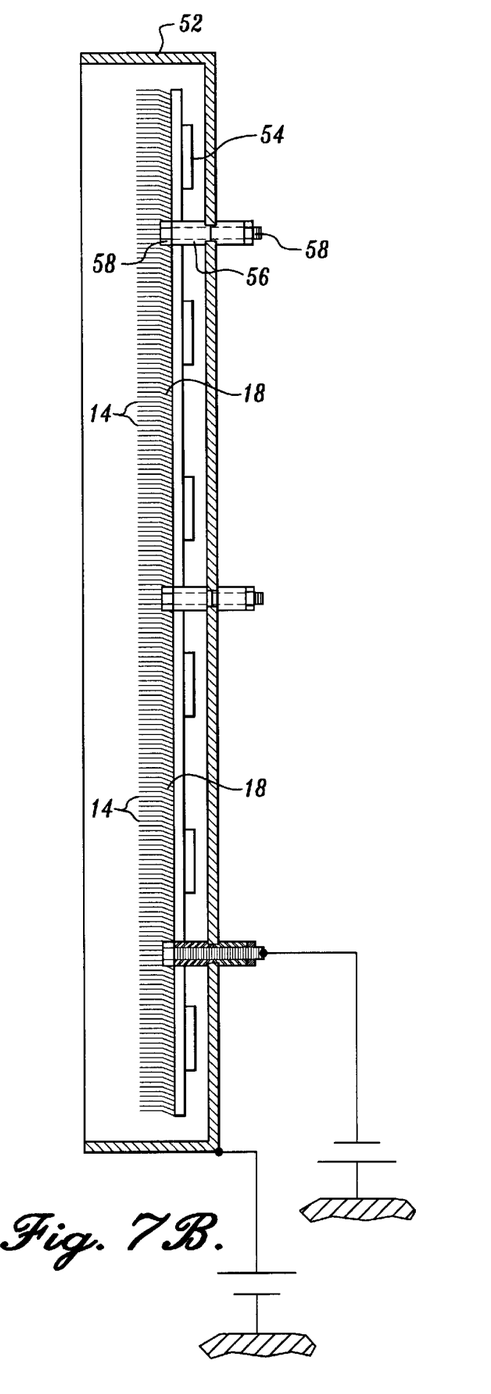

One issue not resolved with the invention shown in FIG. 6 is that fast neutrals are not affected by the biased target 50. Due to charge exchange collisions in the plume, fast neutrals can account for a small (~1%) but non-negligible fraction of the total fast particles incident on the plume shield. Furthermore, if the plume shield is close to the thruster, a build-up of neutrals can occur near the plume shield surface. To minimize the escape fraction of sputter products from high-energy neutrals, one solution, shown in FIG. 7A, is to flock the target surface with tiny fibers 46 (e.g., carbon fibers) which will act as tiny cavities to capture sputter products. Another potential configuration involves implementing one of the cavity geometries on the target as shown, for example, in FIG. 7B where slats 14 and target segments 18 corresponding to FIG. 2 are used. The design issue associated with these approaches is that the electron current will increase because the surface area has increased, and because the tips of the slats are farther from the magnets.

Figure 8A:
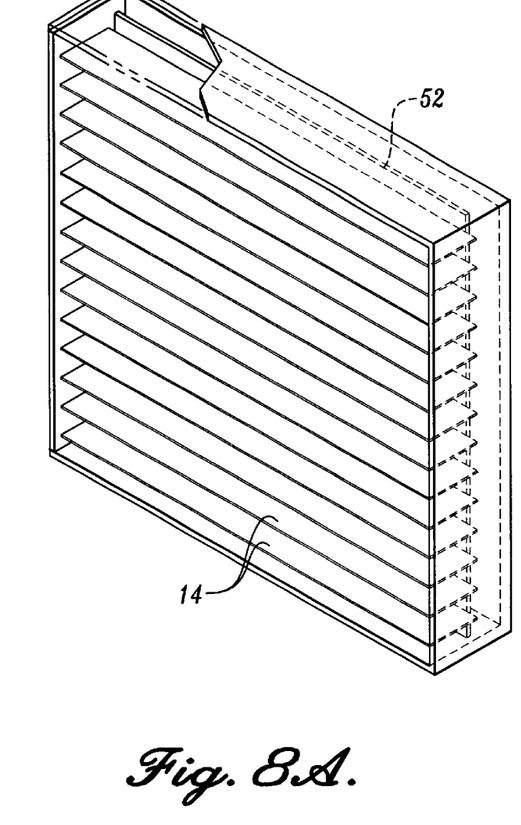
FIG. 8A is a top front perspective of another embodiment of a plume shield in accordance with the present invention.
Figure 8B:
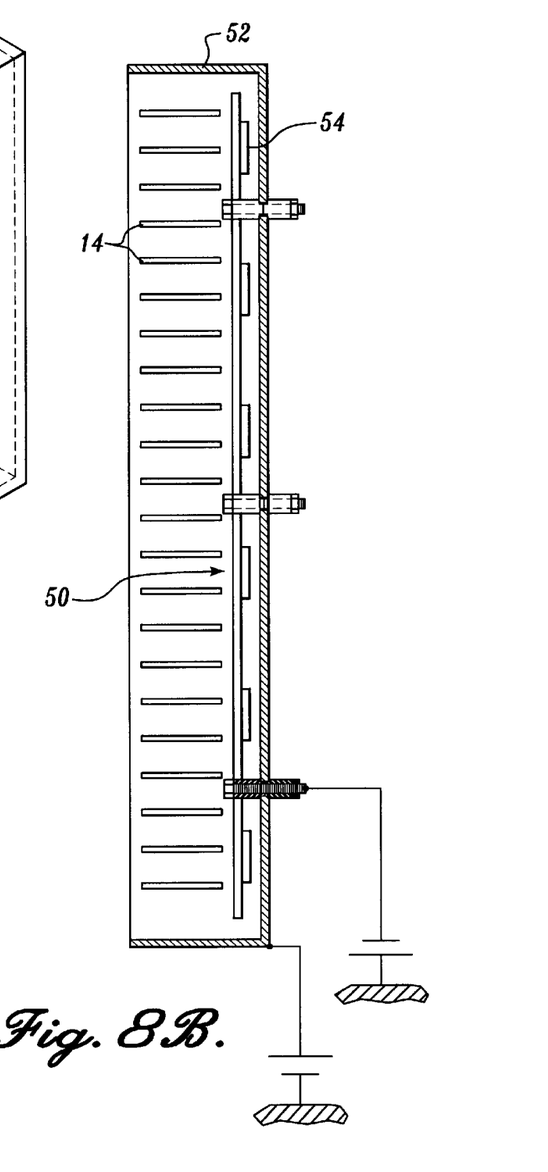
FIG. 8B is a diagrammatic end elevation of the plume shield of FIG. 8A with parts broken away.

The preferred configuration is shown in FIGS. 8A and 8B. In this configuration, the slats 14 are supported and electrically connected to the electron shield enclosure 52. The slats are designed to capture sputter products created by fast neutrals. They may also reduce electron current to the target 50 if the electron Debye length is large compared to the distance between the slats. The ion-retarding louvered plume shield is expected to reduce the quantity of sputtered atoms by at least a factor of 1000 compared to conventional flat plate plume shields.

Up to this point, the expanse of the louvered plume shield has been shown generically in a rectangular configuration with planar base on front sides. In actual application, the plume shield geometry will be thruster and spacecraft specific. Two classes of plume shield applications are envisioned. The first class encompasses plume shields mounted directly or are in close proximity to the thruster (within one exit area diameter from the thruster). This configuration class has many advantages, such as the qualification of the thruster and shield as a unit, the ability to gimbal the shield and thruster as a unit, etc. The second class compasses plume shields located remote from the thruster. The plume shield expanse and the associated deployment mechanisms for these applications are entirely mission specific. Both classes of plume shields, which utilize the features described herein, are covered by this application.

There are many variations to the louvered plume shield and ion-retarding louvered plume shield. It may be advantageous from a cost, power and performance point of view to vary the cavity dimensions, characteristics, and materials inhomogenously inside the plume shield. For instance, placing low escape fraction cavities in high ion flux regions, and inexpensive cavity geometries in low flux regions.

Figures 9, 10:
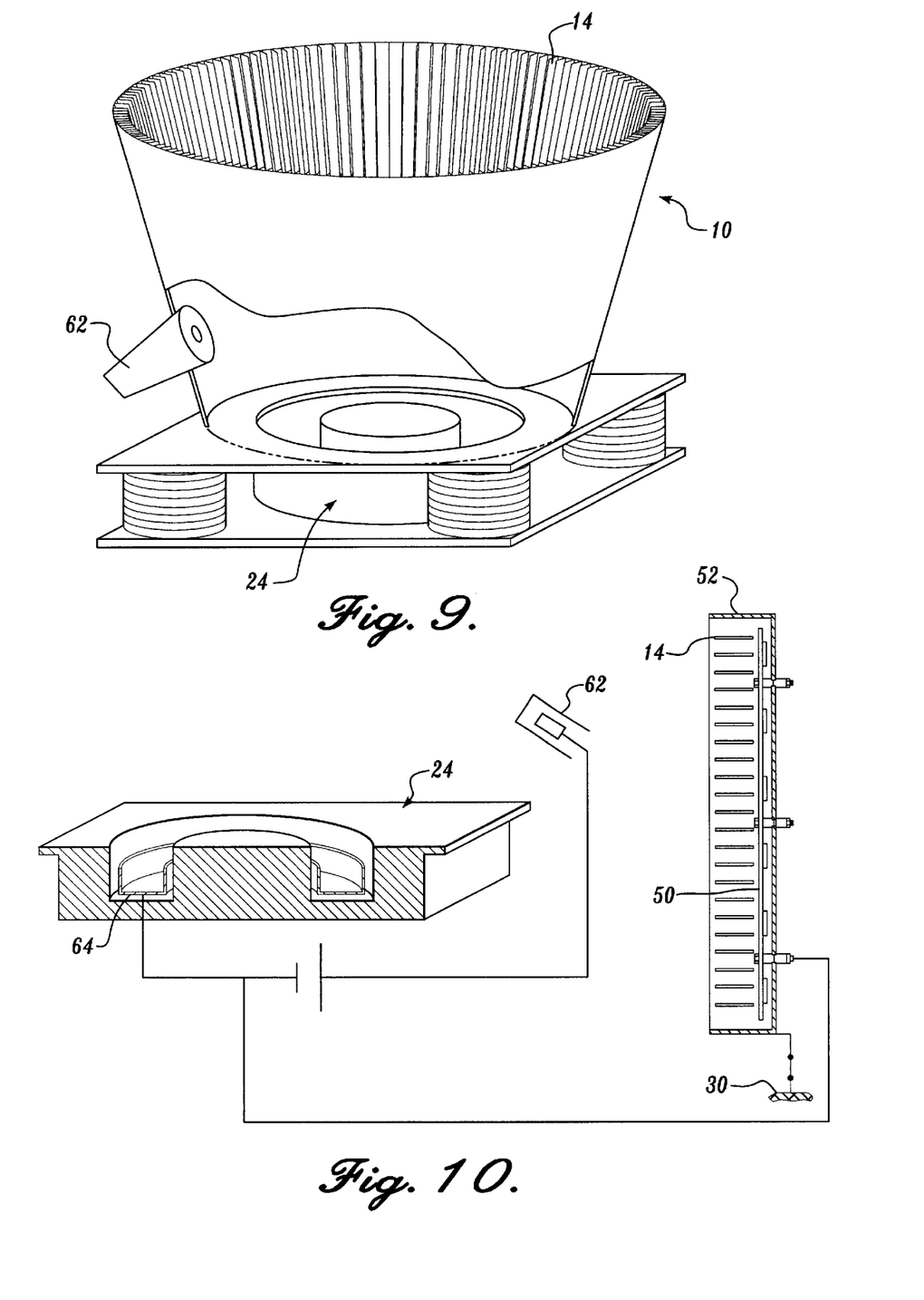
FIG. 9 is a diagrammatic perspective of an ion accelerator having a frustoconical plume shield in accordance with the present invention adjacent to the ion exit end of the accelerator.
FIG. 10 is a diagram of the electrical connection for a representative plume shield in accordance with the present invention in conjunction with an ion accelerator.

FIG. 9 is a schematic drawing of a preferred configuration for both the louvered plume shield and ion-retarding louvered plume shield used locally with a Hall thruster 24 (shown very schematically). A 360-degree shield 10 is designed to screens ions emitted beyond a predetermined critical angle from the thruster centerline. The slats 14 are aligned with the thruster centerline. Both the plume shield and thruster can be qualified and gimbaled together. The plume shield does not necessarily need to encircle the thruster. Often only one side of the plume needs to be screened, such that a 180-degree shield will meet requirements. For the 360 degree configuration, a hole is placed in the shield to allow for electrons from the cathode 62 to enter the discharge. This configuration also has the advantage of collecting erosion products from the thruster. The detailed design of the plume shield will be dictated by design requirements such as mass, plume shield power, escape fraction, etc.

FIG. 10 shows the preferred electric schematic for the ion retarding louvered plume shield shown in FIG. 9. The plume shield target 50 is tied directly to the thruster anode which, in a representative installation, is floating about 335 V above ground. Ions intercepted by the target are slowed to lower than the sputter threshold energy, and thus do not sputter target material. The electron shield enclosure ideally is tied to spacecraft ground, thus eliminating the need to isolate the plume shield structure from the thruster and spacecraft. With proper shield design, the electron current to the plume shield should be much smaller than the Hall thruster operating current. In addition to thruster current, the cathode 62 supplies the small amount of extra current required for the plume shield.

While the preferred embodiment of the invention has been illustrated and described, it will be appreciated that various changes can be made therein without departing from the spirit and scope of the invention. For example, while the invention has been described with respect to thrusters, it also has application where other types of ion accelerators are used, such as in plasma processing operations.

The embodiments of the invention in which an exclusive property or privilege is claimed are defined as follows:

1. A plume shield for an ion accelerator, comprising a base plate, a plurality of first slats extending from the base plate and having corresponding edge portions adjacent to the base plate and corresponding edge portions remote from the base plate, and mini slats located between the first slats and extending from the base plate a distance less than the distance of extension of the first slats.

2. The shield defined in claim 1, in which the first slats and mini slats are elongated and extend parallel to each other.

3. A plume shield for an ion accelerator, comprising a base plate, and a plurality of slats extending from the base plate and having corresponding edges adjacent to the base plate and corresponding edges remote from the base plate, the slats having portions adjacent to the base plate and portions remote from the base plate, the portions of the slats remote from the base plate extending substantially perpendicular to the base plate, and the portions of the slats adjacent to the base plate being angled between the remote portions and the base plate.

4. The combination of an ion accelerator having an exit end from which a plume of accelerated ions is emitted along an axis in an exit direction and a plume shield adjacent to the accelerator exit end, said shield comprising a base plate, and a plurality of slats extending from the base plate and having corresponding edges adjacent to the base plate and corresponding edges remote from the base plate, the slats being aligned with the axis.

5. The combination defined in claim 4, in which the slats have portions adjacent to the base plate and portions remote from the base plate, the portions adjacent to the base plate being angled relative to the portions remote from the base plate, and the edges remote from the base plate being exposed toward the axis.

6. The combination defined in claim 5, in which the portions of the slats remote from the base plate extend substantially perpendicular to the base plate, the portions of the slats adjacent to the base plate being angled between the remote portions and the base plate.

* * * * *